United States Patent
Hassan, III et al.

(10) Patent No.: US 9,794,288 B1
(45) Date of Patent: Oct. 17, 2017

(54) MANAGING POLICY

(71) Applicant: EMC Corporation, Hopkinton, MA (US)

(72) Inventors: Daniel Hassan, III, Raanana (IL); Yafit Levi, Tel Aviv (IL); Maor Franco, Ness Ziona (IL); Ayelet Eliezer, Givatayim (IL); Liron Liptz, Herzelia (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 13/720,449

(22) Filed: Dec. 19, 2012

(51) Int. Cl.
*H04L 29/06* (2006.01)

(52) U.S. Cl.
CPC .................. *H04L 63/20* (2013.01)

(58) Field of Classification Search
CPC ...................................... H04L 63/20
USPC .......................................... 726/1
See application file for complete search history.

(56) References Cited

U.S. PATENT DOCUMENTS

| | | | |
|---|---|---|---|
| 2007/0124591 A1* | 5/2007 | Jung ...................... | G06F 21/31 713/170 |
| 2008/0109873 A1* | 5/2008 | Kulkarni et al. ................. | 726/2 |
| 2009/0249440 A1* | 10/2009 | Platt et al. ......................... | 726/1 |
| 2010/0199077 A1* | 8/2010 | Case et al. ........................ | 713/1 |
| 2011/0209196 A1* | 8/2011 | Kennedy ........................... | 726/1 |
| 2013/0254833 A1* | 9/2013 | Nicodemus et al. ............. | 726/1 |
| 2014/0033275 A1* | 1/2014 | Kawamoto ....................... | 726/3 |

\* cited by examiner

*Primary Examiner* — Kambiz Zand
*Assistant Examiner* — Benjamin Kaplan
(74) *Attorney, Agent, or Firm* — Krishnendu Gupta; Jason A. Reyes

(57) ABSTRACT

There is disclosed a technique for use in managing policy. The technique comprises storing information relating to at least one previous authentication request. It should be understood that the information can be used in an authentication operation performed in connection with an authentication request. The technique also comprises receiving a policy request to alter a policy relating to an authentication operation that can be performed in connection with an authentication request. The technique further comprises generating an alteration to the policy based on the stored information and the received policy request.

6 Claims, 5 Drawing Sheets

150

Policy Improvements

To enable the system to suggest policy improvements define thresholds that suit your business.

The threshold values are per: [Month ▼] — 152

Total # of Challenges:  0    500    1000
Current = 740/month

Total # of Call Center Calls:  154  0    500    1000
Current = 610/month

Total Fraud Losses:  $ [_____] — 156

[Save]  [Cancel]

FIG. 4

MANAGING POLICY

TECHNICAL FIELD

The present invention relates to managing policy.

BACKGROUND OF THE INVENTION

In today's high-tech, fast-paced, hyper-connected world, people are spending more and more time on the internet to complete more of their daily activities such as online banking and shopping. The convenience afforded by the access and availability of the online world, however, is not without drawbacks. This increased access has brought with it an unparalleled growth in online fraudulent activity.

Reports about identity takeover, filled with phrases like Trojan, Man in the Middle, Man in the Browser, and Phishing, are increasingly in the news. These emerging threats have triggered a growing awareness by service providers and customers alike. These threats are serious and must be addressed.

Service providers, such as financial institutions, trying to encourage customer activity while at the same time minimizing losses from financial fraud, are looking for ways to deal with these threats. One possible way is to use a risk-based authentication system with a risk engine associated therewith to assign risk scores to transactions. The transactions with a low risk score can be processed. Those transactions with a high risk score can be rejected or else a further step up challenge can be issued. For example, the risk-based authentication system can be configured to challenge a user to confirm their identity in order to allow a transaction to proceed.

However, the above process of issuing challenges to the user can be expensive. A need therefore exists for techniques for improving risk-based authentication systems.

SUMMARY OF THE INVENTION

In accordance with one embodiment, there is provided a method for use in managing policy comprising the steps of: storing information relating to at least one previous authentication request, wherein the information can be used in an authentication operation performed in connection with an authentication request; receiving a policy request to alter a policy relating to an authentication operation that can be performed in connection with an authentication request; and based on the stored information and the received policy request, generating an alteration to the policy.

In accordance with another embodiment, there is provided an apparatus for use in managing policy. The apparatus comprising a memory and at least one hardware device, coupled to the memory, configured to carry out the method of managing policy.

In accordance with a further embodiment, there is provided article of manufacture for use in managing policy, comprising a tangible machine readable recordable medium containing one or more programs which when executed implement the method of managing policy.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is a schematic diagram illustrating an interface showing a portion of the method of FIG. 3 being implemented within the electronic environment shown in FIG. 1.

DETAILED DESCRIPTION

There is disclosed a technique for use in managing policy. The technique comprises storing information relating to at least one previous authentication request. It should be understood that the information can be used in an authentication operation performed in connection with an authentication request. The technique also comprises receiving a policy request to alter a policy relating to an authentication operation that can be performed in connection with an authentication request. The technique further comprises generating an alteration to the policy based on the stored information and the received policy request.

Figure 1:
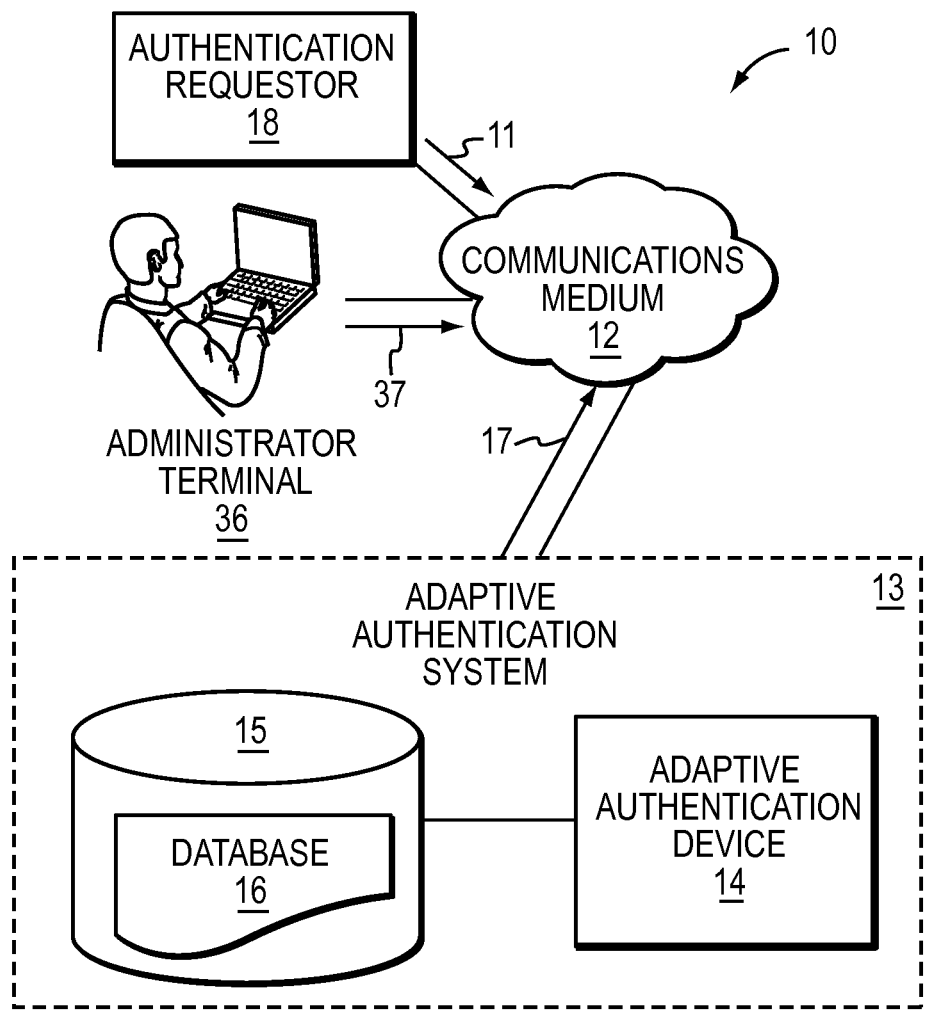
FIG. 1 is a schematic diagram illustrating an electronic environment in which the technique can be implemented.

Referring to FIG. 1, there is illustrated an electronic environment 10 for carrying out the technique. Electronic environment 10 includes communications medium 12, authentication requestor 18, administrator terminal 36 and adaptive authentication system 13.

Communication medium 12 provides connections between authentication requestor 18, administrator terminal 36 and adaptive authentication system 13. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, a request 11. Authentication requestor 18 is further constructed and arranged to send the request 11 to adaptive authentication system 13 to authenticate the user. Authentication requestor 18 is still further constructed and arranged to receive an adaptive authentication result 17 which indicates whether the user is a high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a history of requests from a user over several previous time windows. Adaptive authentication system 13 is further constructed and arranged to send adaptive authentication result 17 to authentication requestor 18. Adaptive authentication system 13 is still further constructed and arranged to manage policy. Adaptive authentication system 13 includes adaptive authentication device 14 and storage device 15.

Storage device 15 is constructed and arranged to store database 16 which contains current and previous data for a user. Database 16 includes a set of entries, each entry of which includes a user identifier, a time period and user data.

Adaptive authentication device 14 is constructed and arranged to perform adaptive authentication operations on request 11 and takes the form of a desktop computer, laptop, server or tablet computer. Specifically, adaptive authentication device 14 receives request 11 from authentication requestor 18 and accesses the previous data having a user identifier matching the username of request 11. Further detail concerning adaptive authentication device 14 are described below with regard to FIG. 2.

Administrator terminal 36 can be used by an administrator to assist in the management of policies 37 relating to adaptive authentication operations performed by adaptive authentication device 14.

Figure 2:
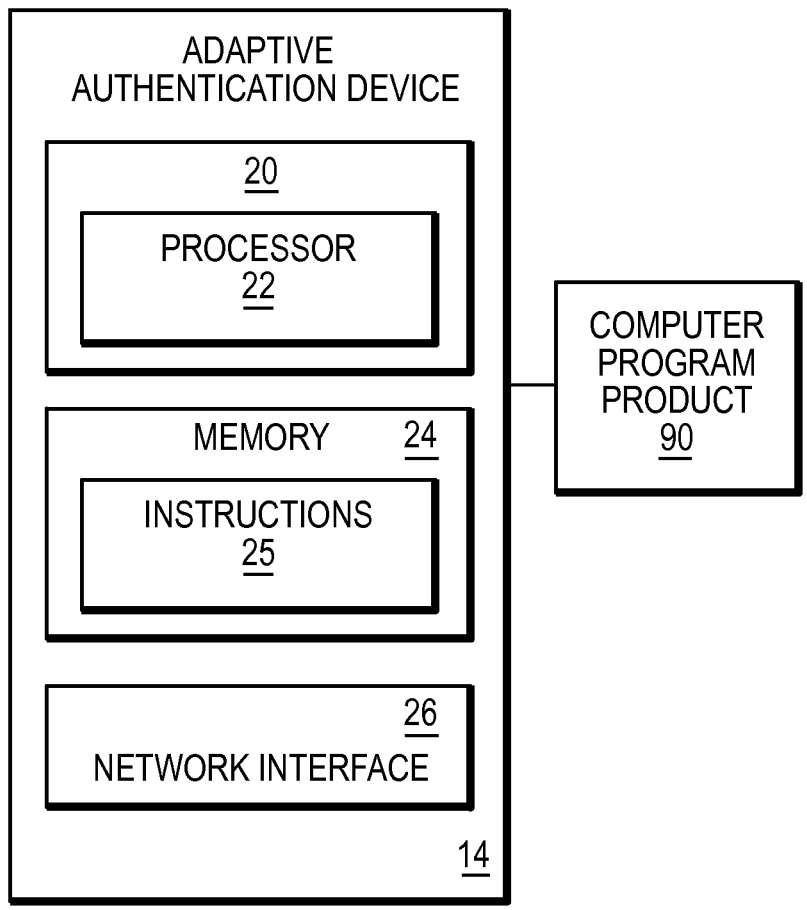
FIG. 2 is a schematic diagram illustrating an adaptive authentication device within the electronic environment shown in FIG. 1.

Referring to FIG. 2, there is illustrated some components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is also configured to store code which includes instructions 25 to manage policies. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database 16.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and non-overlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited to those having time intervals corresponding to the current time period and the four most recent previous time periods. Thus, returning to the above example, when at 12 AM Sunday processor 22 creates a new entry in database 16 having a user identifier matching the username, processor 22 also deletes a corresponding entry having a time interval which is five weeks older than the newly created entry.

Once the lookup operation is complete, processor 22 will perform an adaptive authentication operation by comparing the current user data associated with the request 11 with the historical data obtained from database 16. Such adaptive authentication operations may involve analyzing a user's attributes (e.g., the user's device address, ISP address, location, etc.). Additionally, such operations may involve analyzing certain behavior characteristics of the user's sessions (e.g., a comparison of time of day, length of session, purchase habits, and other activity). The processor 22 then generates an adaptive authentication result based on the comparison indicating a likelihood that the current user data is associated with a fraudulent user.

It should be understood that in this embodiment the processor 22 will perform an additional risk-based authentication operation based on the authentication result indicating a high risk. For example, the processor 22 can issue an out-of-band challenge to the user through the out-of-band device (not shown). The out-of-band challenge requires that the user provide an out-of-band response using the out-of-band device (e.g., a cell phone, email, SMS, etc.). In some arrangements, the challenge is a user specific question that only the user should be able to answer.

Next, the processor 22 makes a decision whether to approve or block the user, and sends the result of that decision to the requestor 18. Upon receipt of the decision, the requestor 18 either approves or blocks access. Such operation may include the creation of a ticket for follow-up by a fraud department.

Additionally, the adaptive authentication device 14 updates its records in the user database 16 with data gathered during the user login attempt. Such information may include identification information of a new user device, a new location, a new access time, etc.

For a more detailed discussion of suitable Adaptive Authentication systems, see for example, U.S. patent application Ser. No. 13/246,937, filed Sep. 28, 2011, entitled "Using Baseline Profiles In Adaptive Authentication" and/or United States Patent Application entitled "Techniques for Authenticating Users of Massive Multiplayer Online Role Playing Games Using Adaptive Authentication," each incorporated by reference herein.

Figure 3:
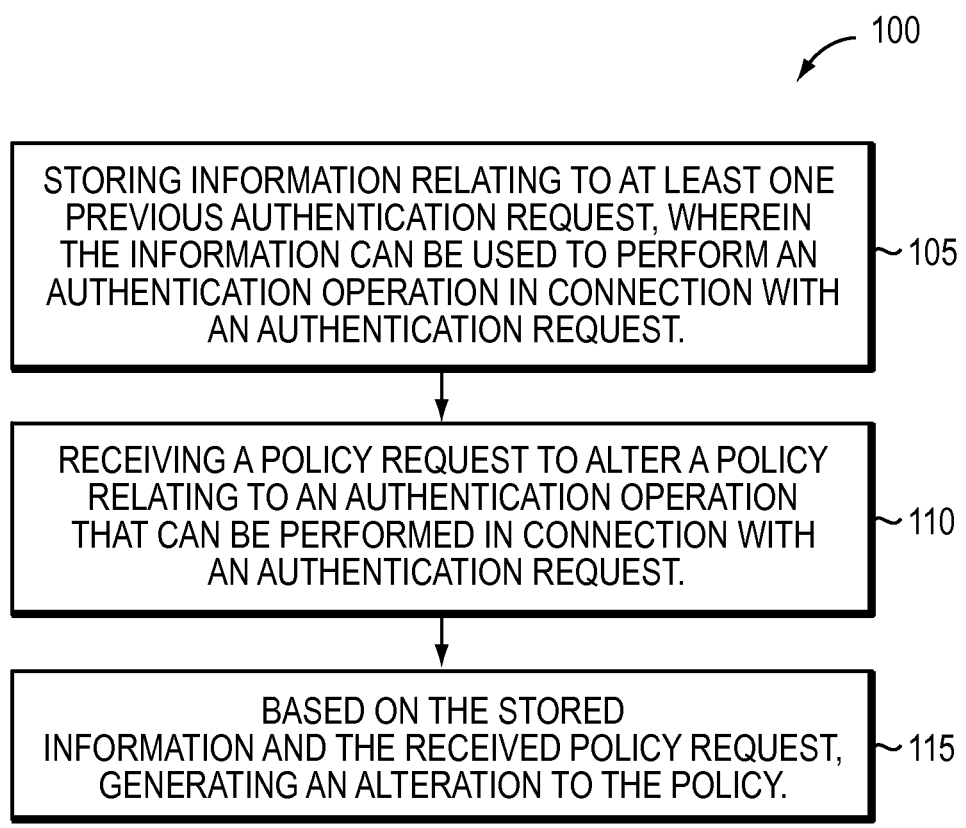
FIG. 3 is a flow chart illustrating a method of carrying out the technique within the electronic environment shown in FIG. 1.

Referring to FIG. 3, there is illustrated a flow diagram of an exemplary method 100 according to some implementations for use in managing policy. In the flow diagram, the operations are summarized in individual blocks. The operations may be performed in hardware, or as processor-executable instructions that may be executed by a processor. Furthermore, the method 100 may, but need not necessarily, be implemented using the adaptive authentication system 13 of FIG. 1.

At step 105, the method comprises storing information relating to at least one previous authentication request similar to the request 11 received at the adaptive authentication system 13 from the authentication requestor 18. It should be understood that this information is suitable for use in an authentication operation performed in connection with an authentication request. For example, the information can have been used in connection with previous requests for authentication as well as being used in connection with future authentication requests. As described above, the information can be the user's attributes (e.g., the user's device address, ISP address, location, etc.) and/or certain behavior characteristics of the previous user's sessions (e.g., a comparison of time of day, length of session, purchase habits, and other activity). The information will be stored in the database 16 with an associated user identifier for enabling future lookup operations to locate the data.

At step 110, the method receives a policy request to alter a policy relating to an authentication operation that can be performed in connection with an authentication request. The policy request can be received from an administrator sending the policy request 37 from the administrator terminal 36. In this embodiment, the policy request relates to the alteration of a policy affecting an additional authentication operation to be performed in connection with an authentication request based on an initial authentication operation determining a high risk in connection with the authentication request. In this embodiment, the policy request will relate to the alteration of a policy affecting the amount of additional authentication operations to be performed over a period of time in connection with authentication requests. Such a policy request will comprise a selected range of additional authentication operations to be performed over a period of time in connection with authentication requests. For example, the policy request can relate to the alteration of a policy affecting the issuance of challenges in connection with authentication requests. As discussed above, a challenge can be issued in response to the initial authentication operation generating a high risk score in connection with a request.

At step 115, the method comprises generating an alteration to the policy based on the stored information and the received policy request. As discussed above, the policy request in this embodiment can relate to the alteration of a policy affecting the amount of additional authentication operations to be performed over a period of time in connection with authentication requests. For example, the policy may currently issue a high number of challenges in connection with authentication requests. As a result, the policy request can comprise a request for a low number of challenges to be issued in connection with authentication requests. Such a request will require an alteration to the policy.

However, in this embodiment, the generation of the alteration to the policy will not only be based on the request but also the stored information in connection with previous requests. This information will be stored in the database 16. The processor 22 can perform a machine learning operation using a machine learning engine on the data in the database 16 to identify a pattern in the stored information. For example, it should be understood that a challenge is issued in connection with risky transactions exceeding a risk threshold. The processor can determine that by increasing the risk threshold the amount of challenges and calls issued will likely decrease to the selected range. The processor 22 consequently generates a new rule associated with the policy. It should be understood that the generation of the new rule can comprise modifying an existing rule associated with the policy. For example, the rule may require a challenge to be issued when the risk score exceeds 950 rather than 900. It should be understood that in this embodiment the new rule requires approval to be incorporated in the policy. The administrator will be required to accept the rule change in order for the new rule to be implemented.

The advantage of the above is that an administrator can be provided with a management interface to create, edit and manage their rules. The system enables an administrator to define a policy which fits within set thresholds that support business needs as well as maintaining the non-intrusive characteristic of adaptive authentication. For example, it will be appreciated by those skilled in the art that challenges are expensive. The system herein enables the user to control the number of challenges such that the cost can be reduced. Genuine end users will continue to be allowed to perform their transactions without interruption whilst at the same time providing step-up challenge or transaction denial for risky transactions. The system also provides suggestions for rule modification or inclusion of a new rule or rules to align to a customer's business needs. A customer can therefore define a profile suitable for their business needs in terms of actual costs including fraud detection rate, number of calls to call center, the number of challenges, acceptable fraud loss amount, the number of cases created to be reviewed by fraud analyst, general limits, different rules for different event types and the like.

Referring to FIG. 4, there is illustrated an interface 150 showing a portion of the above method being implemented. The interface 150 provided at the administrator terminal 36 enables the administrator to select 152 the total number of step-up challenges that the administrator would like to be issued. For example, the administrator can select a range of 400 to 600 challenges that the administrator would like to see issued in the next month. The current total number of challenges issued is 740 per month. The interface also enables the administrator to select 154 the total number of call center calls that administrator would like to be made. For example, the administrator selects a range of 100 to 300 call center calls that the administrator would like to see made in the next month. The current total number of call center calls made is 610 per month. The interface further enables an administrator to select an estimate of the total fraud loss 156 that the administrator would deem to be acceptable. If this amount is exceeded, it may be necessary to alter the policies.

Figure 5:
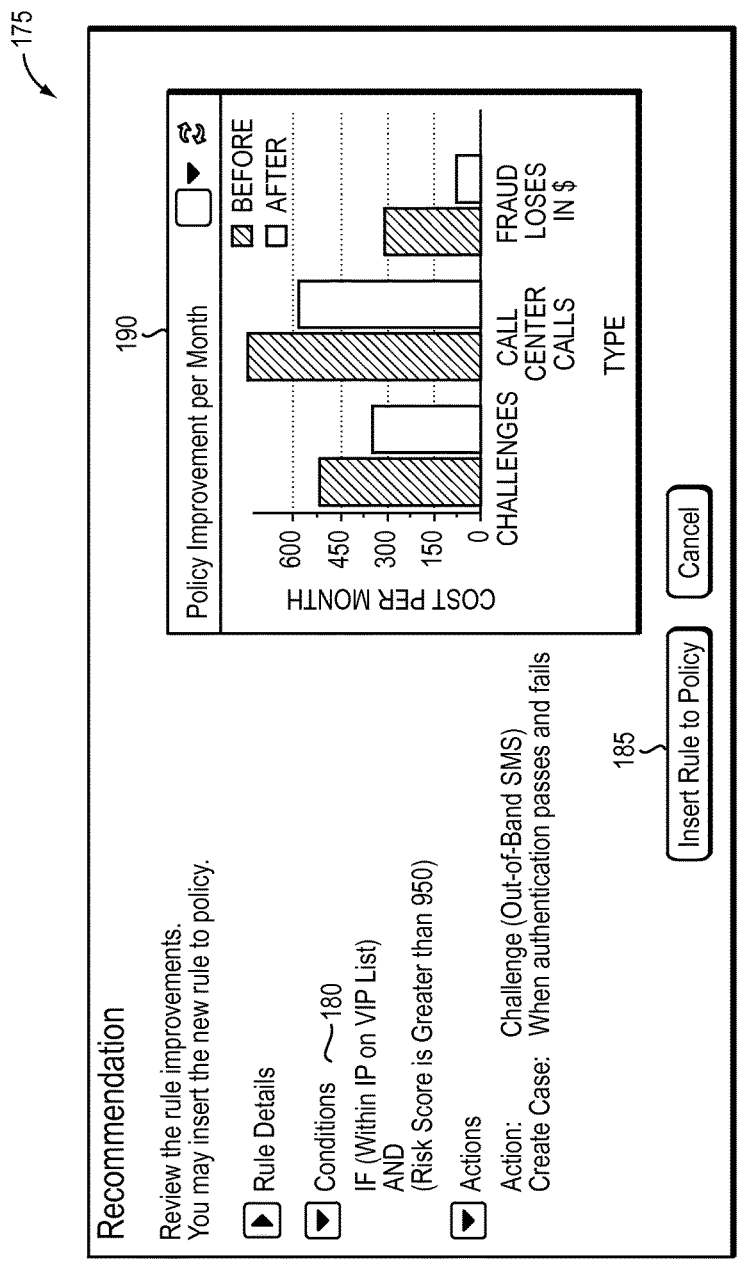
FIG. 5 is a schematic diagram illustrating an interface showing a portion of the method of FIG. 3 being implemented within the electronic environment shown in FIG. 1.

Referring to FIG. 5, there is illustrated an interface 175 showing a portion of the above method being implemented. In this portion, the administrator has selected the range of challenges and call center calls in interface 150. These selected ranges have been received by the authentication system. It should be understood that the system determines an alteration to the policy based on the information in connection with previous transactions in database 16 and the selected ranges. In this case, the system determines that the alteration of a rule within the policy can reduce the number of challenges and call center calls. It can be seen from the figure that the altered rule 180 states that "If (Within IP on VIP List) AND (Risk Score is greater than 950)" then a challenge is to be issued. It should be understood that the threshold may have been increased to 950 in order to reduce the number of challenges and call center calls to the above selected ranges. Indeed, it should be understood that in some embodiments the threshold may have been increased as much as the policy will enable even though the number of challenges and call center calls will not be reduced to the specific ranges. For example, the number of challenges and call center calls to be issued in the next month may be reduced but not as much as selected by the administrator. It should also be appreciated that although the system generates the alteration to the policy by generating a new altered rule associated with the policy, the administrator will be required to select the rule 185 in order for the rule to be implemented as part of the policy.

Additionally, the interface 175 comprises a graph 190 of the cost savings to the administrator by implementing the new adjusted rule. It can be seen from the figure that the graph 190 shows the before and after cost of issuing the challenges and call center calls. In this case, the graph 190 shows the savings possible by implementing the new adjusted rule.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication device 14 for managing policy. Some embodiments are directed to a system for managing policy. Some embodiments are directed to a method of managing policy. Also, some embodiments are directed to a computer program product which enables computer logic to manage policy.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used.

What is claimed is:

1. A method for use in managing policy, the method comprising:
    storing information relating to at least one previous authentication request;
    analyzing the information relating to the least one previous authentication request;
    receiving a policy request to alter a policy relating to the issuance of authentication challenges, wherein the policy request relates to an amount of authentication challenges to be performed over a period of time in the event that authentication operations determine authentication requests to be risky, still further wherein the policy comprises a rule;
    based on the analysis and the policy request, generating a new rule in connection with the policy, wherein the new rule comprises a new threshold for determining whether to issue authentication challenges in connection with future authentication requests;
    displaying a cost associated with the rule and the new rule, wherein the cost relates to the issuance of authentication challenges by the rule and the new rule;
    receiving an approval of the new rule; and
    in response to receiving the approval, modifying the rule based on the new rule.

2. The method as claimed in claim 1, wherein the policy request comprises a selected range of additional authentication operations to be performed over the period of time in connection with authentication requests.

3. An apparatus for use in managing policy, the apparatus comprising:
    a memory; and
    at least one hardware device, coupled to the memory, operative to:
    store information relating to at least one previous authentication request;
    analyze the information relating to the least one previous authentication request;
    receive a policy request to alter a policy relating to the issuance of authentication challenges, wherein the policy request relates to an amount of authentication challenges to be performed over a period of time in the event that authentication operations determine authentication requests to be risky, still further wherein the policy comprises a rule;
    based on the analysis and the policy request, generate a new rule in connection with the policy, wherein the new rule comprises a new threshold for determining whether to issue authentication challenges in connection with future authentication requests;
    display a cost associated with the rule and the new rule, wherein the cost relates to the issuance of authentication challenges by the rule and the new rule;
    receive an approval of the new rule; and
    in response to receiving the approval, modify the rule based on the new rule.

4. The apparatus as claimed in claim 3, wherein the policy request comprises a selected range of additional authentication operations to be performed over the period of time in connection with authentication requests.

5. An article of manufacture for use in managing policy, comprising a non-transitory machine readable recordable medium containing one or more programs which when executed implement the steps of:
    storing information relating to at least one previous authentication request;
    analyzing the information relating to the least one previous authentication request;
    receiving a policy request to alter a policy relating to the issuance of authentication challenges, wherein the policy request relates to an amount of authentication challenges to be performed over a period of time in the event that authentication operations determine authentication requests to be risky, still further wherein the policy comprises a rule;
    based on the analysis and the policy request, generating a new rule in connection with the policy, wherein the new rule comprises a new threshold for determining whether to issue authentication challenges in connection with future authentication requests;
    displaying a cost associated with the rule and the new rule, wherein the cost relates to the issuance of authentication challenges by the rule and the new rule;
    receiving an approval of the new rule; and
    in response to receiving the approval, modifying the rule based on the new rule.

6. The article of manufacture as claimed in claim 5, wherein the policy request comprises a selected range of additional authentication operations to be performed over the period of time in connection with authentication requests.

* * * * *